United States Patent [19]

Sasaki

[11] 4,161,058
[45] Jul. 17, 1979

[54] METHOD FOR ATTACHING STEERING WHEEL

[75] Inventor: Shinichi Sasaki, Okazaki, Japan

[73] Assignee: Toyota Jidosha Kogyo Kabushiki Kaisha, Aichi, Japan

[21] Appl. No.: 878,430

[22] Filed: Feb. 16, 1978

[30] Foreign Application Priority Data

Aug. 25, 1977 [JP] Japan .................................. 52-101125

[51] Int. Cl.² .............................................. B23P 11/00
[52] U.S. Cl. .......................................... 29/428; 24/407
[58] Field of Search ............. 29/407, 428, 273, 159 B, 29/159.1; 116/31

[56] References Cited

U.S. PATENT DOCUMENTS

| 3,235,953 | 2/1966 | Adams | 29/407 |
| 3,734,051 | 5/1973 | Dahl | 116/31 |

*Primary Examiner*—Michael J. Keenan
*Attorney, Agent, or Firm*—Toren, McGeady and Stanger

[57] ABSTRACT

A steering wheel having a 'T' type spoke is attached to a steering column, with an axis of symmetry of steering wheel being angularly biased through an angle y relative to the forward direction of a vehicle, with the direction of the vehicle being stabilized on a stage of a toe-in tester. The vehicle is placed on the stage with the front wheels of the vehicle mounted on drive rollers, and the drive rollers are moved in a manner to place the axes of the drive rollers perpendicular to the axis of the stage as well as to the planes of rotation of the front wheels. Thereby, slide-slipping angles $\alpha_R$, $\alpha_L$ and camber angles $C_{NR}$, $C_{NL}$ of the right and left front wheels respectively, are determined so as to determine the compensating angle y, according to the equation $$y = a(\alpha_R + \alpha_L) + b(C_{NR} - C_{NL}) + c,$$

wherein a,b,c represent constants determined by the type of vehicle involved.

2 Claims, 9 Drawing Figures

DIFFERENCE IN CAMBER ANGLE BETWEEN
RIGHT AND LEFT FRONT WHEELS AS
DERIVED FROM READINGS OF A CAMBER METER

STEER ANGLE READ
FROM TOE METER

ACTUALLY MEASURED COMPENSATING ANGLE

CALCULATED COMPENSATING ANGLE

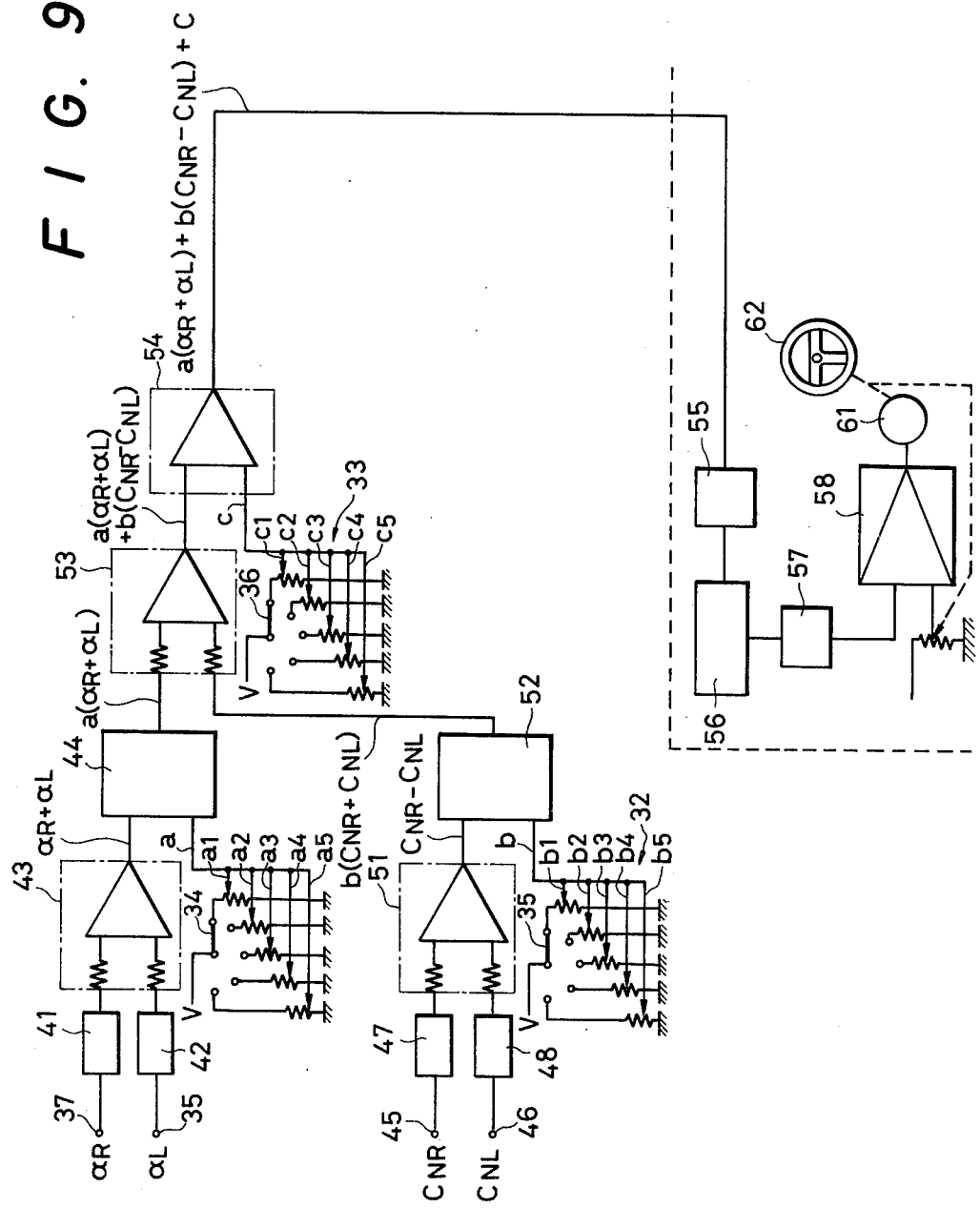

METHOD FOR ATTACHING STEERING WHEEL

BACKGROUND OF THE INVENTION (1) Field of the invention

This invention relates to a method for attaching a steering wheel to the steering column of a motor vehicle, and more particularly to a technique for fixing the steering wheel to a steering column in such a manner that the axis of symmetry of the steering wheel, which may be of the type including a 'T' type spoke, may be parallel with the forward direction of the vehicle when the vehicle is in operation.

(2) Description of the prior art

A common complaint arising with the use of motor vehicles results from an off-center steering mechanism. This problem results in a phenomenon wherein, when the vehicle runs in the forward direction, the symmetry axis of a steering wheel with a 'T' type spoke will be somewhat inclined rightwardly or leftwardly relative to the forward direction of the vehicle. Although such a problem is not usually the direct cause of an accident, it is likely to cause concern on the part of a driver as to the functional reliability of the vehicle, particularly with regard to defective alignment of the front wheels.

It has been general practice to attach a steering wheel to a steering column, when the direction of the vehicle is stabilized on a toe-in tester; that is, when the direction of the vehicle is angularly biased neither rightwardly nor leftwardly on the stage of a toe-in tester. The phenomenon of off-center steering, as will be discussed in detail hereinafter, can not always be attributed simply to faulty workmanship, since it may result from difference in forces acting on tires when the vehicle is in a stable condition on a toe-in tester and during running of a vehicle in a forward direction on an actual road.

Acccordingly, it is an object of the present invention to provide a method for attaching a steering wheel to a vehicle steering column on a toe-in tester thereby to avoid off-center steering phenomenon during forward running of a vehicle on an actual road.

SUMMARY OF THE INVENTION

According to the present invention, there is provided a method for attaching a steering wheel to a steering column, which comprises the steps of: placing a vehicle on the stage of a toe-in tester so as to mount the front wheels of the vehicle on drive rollers; moving the drive rollers in a manner that their axes may be perpendicular to the axis of the stage as well as to the planes of rotation of the front wheels, thereby detecting side-slipping angles of the right and left front wheels relative to the drive rollers, and camber angles of the right and left front wheels so as to determine a compensating angle; and attaching a steering wheel having, for example, a 'T' type spoke, to a steering column, with the axis of symmetry of the steering wheel being angularly biased through the aforementioned compensating angle relative to the forward direction of the vehicle, when the direction of the vehicle is stabilized on the stage of the toe-in tester.

The various features of the novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 9 is an apparatus for practicing the method according to the invention.

DESCRIPTION OF THE PREFERRED EMBODIMENTS

Figure 1:
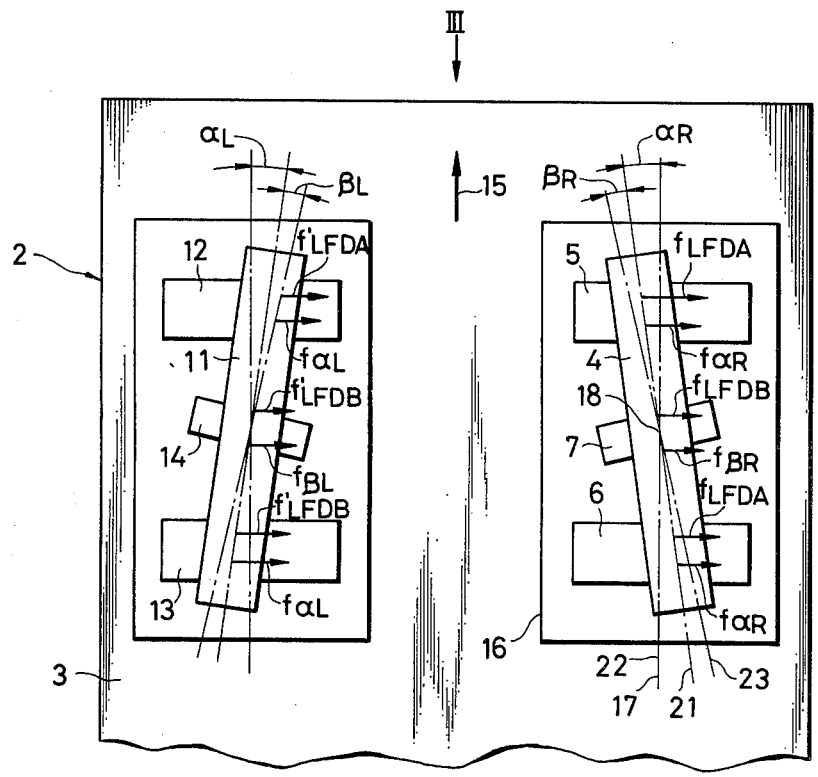
FIG. 1 is a view illustrative of forces acting on the front wheels of a vehicle an a toe-in tester, as viewed from the line I—I of FIG. 3.
Figure 2:
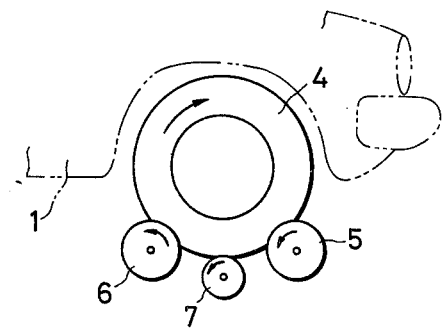
FIG. 2 is a view showing a positional relationship between front wheels and rollers.

As shown in FIGS. 1 and 2, a vehicle 1 is placed on a stage 3 of a dynamic toe-in tester 2. In this respect, a right front wheel 4 should be mounted on drive rollers 5, 6, and a detecting roller 7, while a front left wheel 11 should be mounted on drive rollers 12, 13 and a detecting roller 14.

The arrangement of the drive rollers 5, 6 and detecting roller 7 is essentially similar to that of the drive rollers 12, 13 and detecting roller 14, and thus the following description will refer only to the arrangement of the drive rollers 5, 6 and detecting roller 7.

The detecting roller 7 is smaller in diameter than the drive rollers 5, 6 and is positioned between the drive rollers 5 and 6. The detecting roller 7 contacts a lowermost portion of the right front wheel 4 and is adapted to be rotated due to the rotation of the right front wheel 4. An arrow 15 represents the axial direction of the stage 3, and the arrow 15 points toward the forward direction of the stage 3.

A device 16 including the drive rollers 5, 6 and detecting roller 7 may turn about an axis 17 parallel with the axis 15 through a given angle. In the device 16, the axes of drive rollers 5, 6 are parallel with each other, while the detecting roller 7 may turn about an axis 18 which is perpendicular to an axis 17 as well as to a plane including the axes of the drive rollers 5, 6. In addition, the detecting roller 7 may be displaced a given distance in the axial direction.

Figure 3:
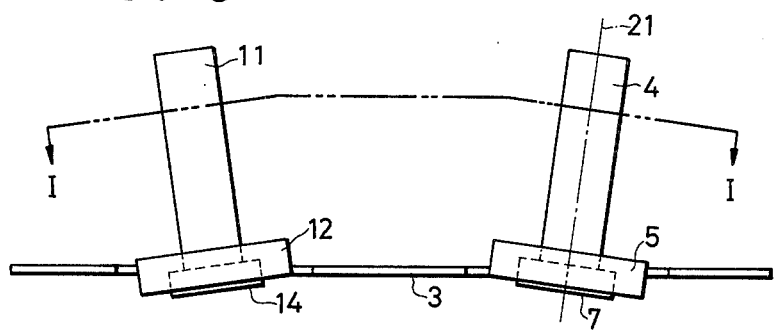
FIG. 3 is a view as seen from the direction of an arrow III in FIG. 1.

When the vehicle 1 is placed on the stage, then drive rollers 5, 6 start rotating, and the device 16 turns about the axis 17, so that the plane of the device 16 including the drive rollers 5, 6 and detecting roller 7 may be turned to a plane which includes the axis 17 and is perpendicular to a plane of rotation 21 (FIG. 3). The detecting roller 7 may be rotated about the axis 18, while the axis of the detecting roller 7 may be inclined at a given angle to the plane 21 of rotation.

Shown at 22 is a plane including axes 17, 18 which are perpendicular to each other. Shown at 23 is a plane which includes the axis 18 and is perpendicular to the axis of the detecting roller 7. Shown at $\alpha_R$ is the intersecting angle between the plane 21 and the plane 22 (side-slipping angle of the right front wheel relative to drive rollers 5, 6), and at $\beta_R$ the intersecting angle between the plane 21 and the plane 23 (side-slipping angle of the right front wheel relative to the detecting roller 7). Similarly, $\alpha_L$ and $\beta_L$ are designated for the left front wheel 11.

The following equation may be established, based on a balance of forces acting on the vehicle, with forces directed rightwardly being defined as positive forces.

$$2f_{LFDA} + f_{LFDB} + 2f_{\alpha R} + f_{\beta R} + 2f'_{LFDA} + f'_{LFDB} + 2f_{\alpha L} + f_{\beta L} = 0 \quad (1),$$

wherein
$f_{\alpha R}, f_{\alpha L}, f_{\beta R}, f_{\beta L}$—lateral forces created due to slide-slipping angles ($\alpha_R, \alpha_L, \beta_R, \beta_L$) of the front wheels, and
fLFDA, fLFDB, f'LFDA, f'LFDB—latent forces created due to a lateral-force deviation of the front wheels.

Since the detecting rollers 7, 14 may be moved in the axial direction, the following equations may be established.

$$f_{LFDB} = -f_{\beta R} \quad \ldots (2)$$

$$f'_{LFDB} = -f_{\beta L} \quad \ldots (3)$$

In addition, the following equation is established for the side-slipping angles $\alpha_R, \alpha_L$ of the front wheels.

$$f_{\alpha R} + f_{\alpha L} = k(\alpha_R + \alpha_L) = k \cdot 2\theta \quad \ldots (4)$$

$$2\theta = \alpha_R + \alpha_L$$

wherein $\theta$ represents a steer angle, wherein k is a constant dependent on the front wheel or tire.

The equation (1) may be modified by the equations (2), (3), (4), as follows:

$$f_{LFDA} + f'_{LFDA} + k \cdot 2\theta = 0 \quad \ldots (5)$$

Figure 4:
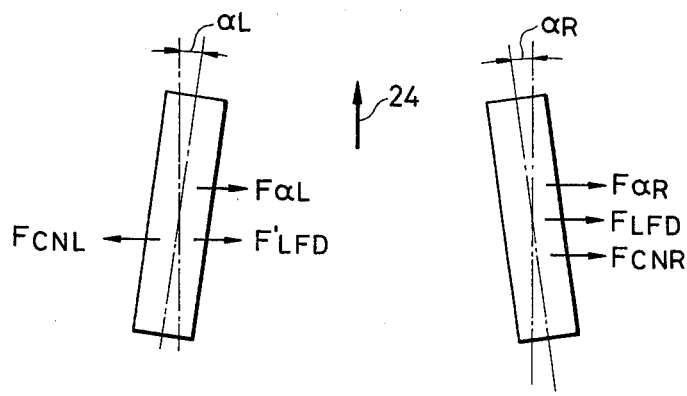
FIG. 4 is a view illustrative of forces acting on front wheels of a vehicle, when the vehicle runs straight ahead.

FIG. 4 shows lateral components of forces acting on the front wheels, when a vehicle runs in a forward direction indicated by the arrow 24.

The symbols indicated in FIG. 4 are defined as follows:

$\alpha_R, \alpha_L$: side-slipping angles of front wheels (R, L relate to the right front wheel and left front wheel, respectively.)

F$\alpha$R, F$\alpha$L: lateral forces created due to side-slipping angles $F_{LFD}, F'_{LFD}$: lateral forces created due to LFD $F_{CNR}, F_{CNL}$: camber thrusts Assuming that $\theta = \alpha_R + \alpha_L$ (steer angle) then the following equation is established, based on a balance of forces, when the vehicle runs in a forward direction on an actual road:

$$F_{LFD} + F'_{LFD} + F_{CNR} - F_{CNL} + K \cdot 2\theta = 0 \quad \ldots (6)$$

In this respect, camber thrust may be expressed by a linear equation of the camber angle, depending on the type of front wheels. The equation (6) may be expressed as follows:

$$F_{LFD} + F'_{LFD} + A(C_{NR} - C_{NL}) + K \cdot 2\theta = 0 \quad \ldots (7)$$

As can be seen from a comparison of equations (5) and (7), the steer angle of the front wheel varies, depending on whether the vehicle is stable on a toe-in tester or whether the vehicle runs forwardly on an actual road. Despite this fact, a steering wheel is attached to a steering column, assuming that the stable condition of the vehicle on a toe-in tester completely simulates the forward running condition of the vehicle. This causes an off-center steering phenomenon.

The difference between a steer angle during actual forward running and a steer angle in the stable condition on a toe-in tester is given as follows:

$$\Theta - \theta = -\frac{1}{2}\left[\frac{A}{K}(C_{NR} - C_{NL}) + \frac{1}{K}(F_{LFD} + F'_{LFD}) - \frac{1}{K}(f_{LFD} + f'_{LFD})\right] \quad (8)$$

In this respect, $F_{LFD}$ for forward running of the vehicle, and $f_{LFD}$ in the stable condition on a toe-in tester are created in the same tire, but differ from each other, depending upon differences in the condition of ground contact. Thus, the following equation is established:

$$F_{LFD} + F'_{LFD} = d_1(f_{LFD} + f'_{LFD}) \quad \ldots (9),$$

wherein $d_1$ is a constant.

Accordingly, the equation (8) may be modified as follows:

$$\Theta - \theta = d_2(C_{NR} - C_{NL}) + d_3(f_{LFD} + f'_{LFD}) \quad \ldots (10)$$

In other words, the difference in steer angles ($\Theta - \theta$) during forward running and in the stable condition in a toe-in tester may be derived from a difference in camber angle between the left and right front wheels, and the sum of LFD$_s$ of the left and right front wheels on a toe-in tester.

As shown in FIG. 3, due to the operation of the device 16, the respective axes of the drive rollers 5, 6 and detecting roller 7 may be included in respective planes perpendicular to the plane 21 of rotation of the right front wheel 4. By detecting an inclination or angle of the device 16, i.e., inclinations or angles of the drive rollers 5, 12 to the ground surface, a chamber angle of the right front wheel 4 may be detected. A camber angle of the left front wheel 11 may also be detected in similar fashion. Tests and experiments including 30 vehicles have been performed with regard to differences in readings of a camber meter, i.e., the relationship between the differences in camber angle between the left and right front wheels in a stable condition on a toe-in tester, and during forward operation of a vehicle under actual road conditions.

Figure 5:
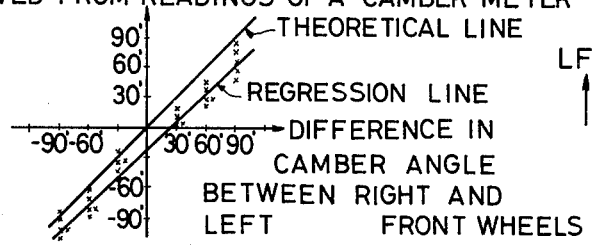
FIG. 5 is a graph showing the accuracy of a camber meter.

As can be seen from FIG. 5, an interrelationship exists between the above two factors. As can be seen from equation (5), the sum of LFDs for the left and right front wheels on a toe-in tester is proportional to a steer angle $\theta$ on the toe-in tester. Accordingly, $f_{LFD} + f'_{LFD}$ may be derived by detecting the sum of side-slipping angles $\alpha_R$, $\alpha_L$ of the left and right front wheels on a toe-in tester.

Figure 6:
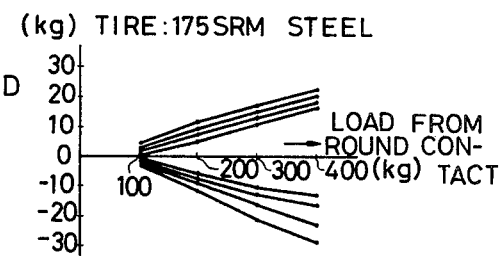
FIG. 6 is a graph showing the relationship between load from ground contact and LFD.
Figure 7:
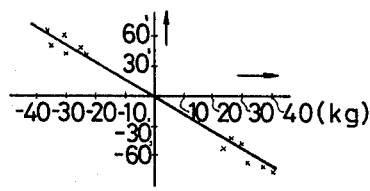
FIG. 7 is a graph showing the relationship between LFD and a steer angle derived from an indicated value of a toe-meter.

The detecting rollers 7, 14 shown in FIG. 1 detect the side-slipping angles $\alpha_R$, $\alpha_L$. The detecting roller 7 may turn about the axis 17, so that the axis of the detecting roller 7 may be directed perpendicular to the plane 21 of rotation. It follows from this that the side-slipping angle $\alpha_R$ may be derived by detecting an angle, through which the detecting roller 7 turns about the axis 18. Likewise, the side-slipping angle $\alpha_L$ of the left front wheel may be derived by the detecting roller 11. However, the influence of LFD is exerted on the detecting rollers 7, 14 as well, so that, as shown in FIG. 1, the plane 23 is not in alignment with the plane 21, and hence there exists some side-slipping represented by angles $\beta_R$, $\beta_L$. Investigation was directed toward the relationship between the magnitude of LFD and the load due to ground contact for determining the side-slipping angles $\beta_R$, $\beta_L$. This is best shown in FIG. 6. As shown, LFD remains almost zero, when the load due to ground contact is about 50 Kg. Accordingly, the load from the ground contact for the detecting rollers 7, 14 is set to about 50 Kg, and then tires, whose LFDs have been measured, are mounted on wheel drums for determining the relationship between LFDs and steer angles $\theta$ obtained from $\alpha_R$, $\alpha_L$ which have been read from the toe-meter. FIG. 7 represents the above relationship. As shown, there is an interrelationship between LFD and steer angle.

The equation (10) may be expressed as follows:

$$\Theta - \theta = d_4 (C_{NR} - C_{NL}) + d_5 (\alpha_R + \alpha_L) \quad \ldots (11),$$

wherein $d_4$, $d_5$ are constants.

Thus, what is required for the attachment operation of the steering wheel is not $\Theta - \theta$, but an inclination of a steering wheel which has been caused by $\Theta - \theta$, i.e., the angle of the symmetry axis of the steering wheel relative to the forward direction of the vehicle. The relationship between the steer angle and the deviated angle may be determined, primarily depending on the dimensions of a linkage and a gear ratio of a gear box. Thus, the equation (11) may be modified as follows:

$$y = a(\alpha_R + \alpha_\beta) + b(C_{NR} - C_{NL}) + C \quad \ldots (12),$$

wherein y is a compensating angle (°) of the symmetry axis of the steering wheel, which deviates from the forward running direction of the vehicle in a stable condition on a toe-in tester, a,b,c being constants, with units of $\alpha_R$, $\alpha_\beta$, $C_{NR}$, $C_{NL}$ ... (').

A regression equation (12) for vehicles having radial tires particularly for use in the U.S.A. may be given as follows:

$$y = -0.008x_1 + 0.06x_2 + 4.7 \quad \ldots (13)$$

with a multiple-correlation coefficient of 0.89.

Figure 8:
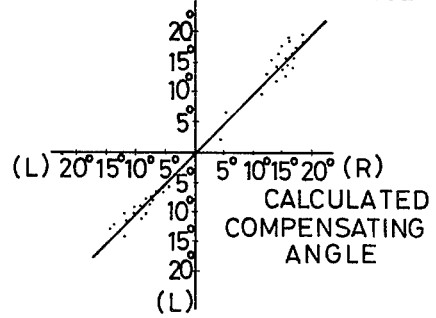
FIG. 8 is a graph showing the relationship between a compensating angle derived from an equation according to the invention, and an actual compensating angle.

FIG. 8 is a graph representing the relationship between compensating angles and actually measured angles for vehicles intended for use in the U.S. This establishes the reliability of equation (13).

FIG. 9 shows an apparatus to which the equation (12) is applied.

The constants a,b,c in the equation (12) are specifically determined for each type of vehicle. For the common use of a single toe-in tester for two or more types of vehicles, constant-value selective circuits 31,32,33 are provided. Selective switches 34,35,36 for the constant-value selective circuit 31,32,33 are maintained in cooperative relation. Electric signals representing $\alpha_R$, $\alpha_L$ which have been detected by the detecting rollers 7,14 are delivered to terminals 37,38 for equalization in the equalizing circuits 41,42 and then to an adder 43. The adder 43 delivers outputs corresponding to $\alpha_R + \alpha_L$, and then the outputs are delivered to a multiplier 44, along with an electric signal from the constant-value selective circuit 31, whereby electric signals corresponding to $[a(\alpha_R + \alpha_L)]$ are developed in a multiplier 44. Likewise, electric signals representing $C_{NR}$, $C_{NL}$ are delivered to the terminals 45, 46 for equalization in equalizing circuits, and then to a subtractor 51. A multiplier 52 produces an output corresponding to $(C_{NR} - C_{NL})$ from an electric signal which corresponds to $C_{NR} - C_{NL}$ and is fed from the subtractor 51, and an electric signal fed from the constant-value selective circuit 32 relating to b. The adder 53 produces an output corresponding to $[a(\alpha_R + \alpha_L) + b(C_{NR} - C_{NL})]$ and then the output is delivered to the adder 54 along with an electric signal fed from the constant-value selective circuit 33 relating to C. In this manner, an electric signal corresponding to y, i.e., a $(\alpha_R + \alpha_L) + (C_{NR} - C_{NL}) + C$ may be derived by the adder 54. This electric signal is delivered to an analog-digital converting circuit 55 and then digitally displayed in a display tube 56 which may be latch-held.

For improvement of the operational efficiency, a compensating angle y displayed in the display tube 56 is delivered via digital-analog converting circuit 57 and amplifier 58 to a synchronous motor 61, and then the synchronous motor 61 operates a dummy steering wheel 62 to draw the attention of an operator for a compensating angle.

As is apparent from the foregoing, the side-slipping angles $\alpha_R$, $\alpha_L$ and camber angles $C_{NR}$, $C_{NL}$ of front wheels are detected on a toe-in tester for determining the compensating angle y, so tht a steering wheel may be attached to steering column in a manner to avoid off-center steering phonomenon when a vehicle runs in a forward direction under actual road conditions.

While a specific embodiment of the invention has been shown and described in detail to illustrate the application of the inventive principles, it will be understood that the invention may be embodied otherwise without departing from such principles.

What is claimed is:

1. A method for attaching a steering wheel having a linear axis of symmetry to the steering column of a motor vehicle, said method comprising the steps of:
    placing said vehicle on the stage of a toe-in tester including drive rollers so as to mount the front wheels of said vehicle on said drive rollers, said stage defining an axis thereof;
    moving said drive rollers in a manner that the axes of said drive rollers are perpendicular to the axis of said stage as well as to the planes of rotation of said front wheels;
    detecting thereby slide-slipping angles $\alpha_R$, $\alpha_L$ of right and left front wheels of said vehicle relative to said drive rollers;
    also detecting camber angles $C_{NR}$, $C_{NL}$ of said right and left front wheels so as to determine a compensating angle y; and
    attaching said steering wheel to said steering column with the axis of symmetry of said steering wheel being angularly biased through said compensating angle y relative to the forward direction of travel of said vehicle when the direction of said vehicle is stabilized on said stage of said toe-in tester;

said compensating angle y being determined by the equation $$y = a(\alpha_R + \alpha_L) + (C_{NR} - C_{NL}) + C$$

wherein a,b,c are constants dependent upon the type of vehicle involved.

2. The method according to claim 1, wherein there are provided two drive rollers for driving each of the front wheels of a vehicle upon which a steering wheel is to be attached, and a detecting roller disposed between said drive rollers, said detecting roller being capable of turning about a vertical axis perpendicular to a plane including the axes of said two drive rollers, said method including detecting a rotational angle of said detecting roller about said vertical axis while minimizing the load acting on said detecting roller from said front wheels thereby to detect the side-slipping angles $\alpha_R$, $\alpha_L$ of said front wheels relative to said drive rollers.

* * * * *